United States Patent Office 3,766,094
Patented Oct. 16, 1973

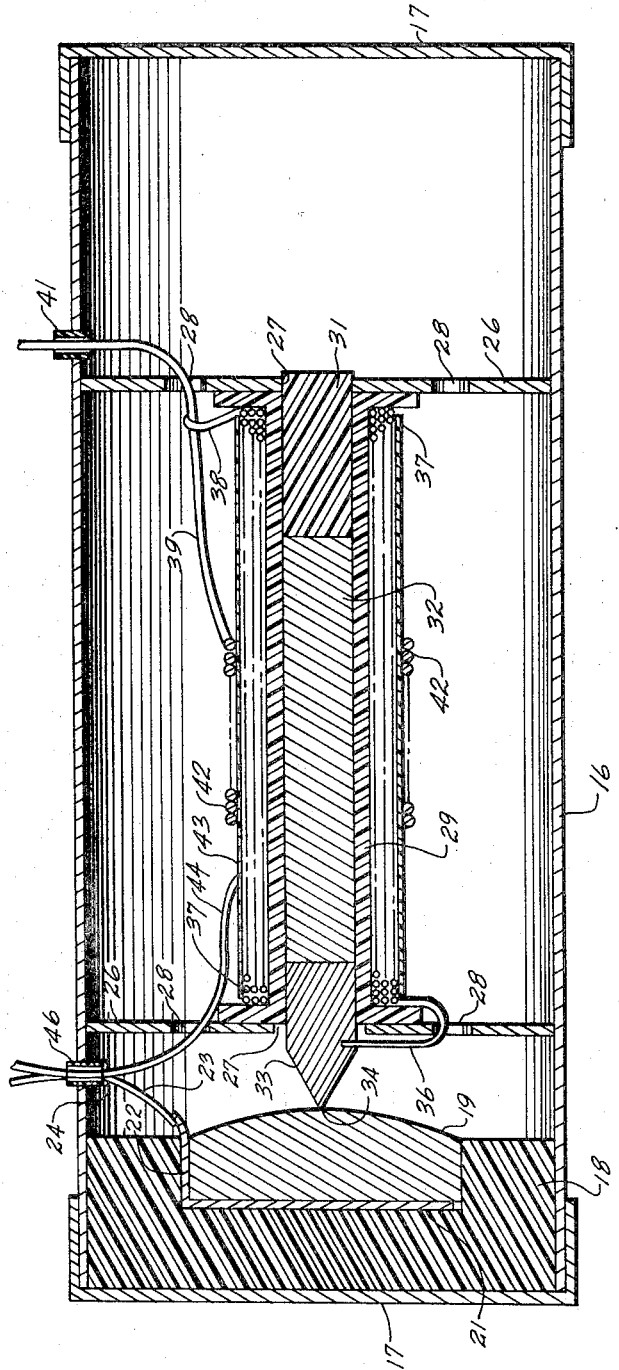

3,766,094
SEMICONDUCTOR COMPOSITIONS
Michael Ognyanov, 327 Alpine St.,
Pasadena, Calif. 91106
Continuation-in-part of abandoned application Ser. No. 77,452, Oct. 2, 1970. This application Sept. 20, 1971, Ser. No. 181,944
Int. Cl. H01b 1/00
U.S. Cl. 252—512
7 Claims

ABSTRACT OF THE DISCLOSURE

A resonance oscillator electric power pack for operating a flash lamp, for example, or other electrically operated device, operates without moving mechanical parts or electrolytic action. The power pack is contained in a cylindrical metal envelope and in a preferred embodiment is coupled to a relaxation oscillator and an incandescent lamp. Within the envelope, and insulated therefrom, is a semiconductor tablet having a metal base connected to the external circuit. A metal probe makes contact with a point on the semiconductor tablet and also with a cylindrical ferrite rod axially aligned with the envelope. Wound about the ferrite rod are concentric helical coils designated as a primary with many turns and a secondary with fewer turns than the primary. The primary coil is connected at one end to the probe and at the other end to the secondary coil. The leads from the secondary coil are connected to the relaxation oscillator by way of an adjustable capacitor. Oscillation within the envelope is resonance amplified, and the induced voltage in the secondary coil is rectified for application to the relaxation oscillator and lamp. Selenium and germanium base semiconductor compositions including Te, Nd, Rb and Ga in varying proportions are used for the tablet.

BACKGROUND

This is a continuation-in-part of my copending patent application Ser. No. 77,452, filed Oct. 2, 1970, entitled "Electric Power Pack," and now abandoned.

In many situations it is desirable to have a source of electric power that is not dependent on wires from a central generating station and, therefore, portable power supplies having no moving parts have been employed. Typically, such portable power packs have been primary or secondary electrolytic cells which generate or store electrical energy for release by chemical action. Such batteries have a limited amount of contained energy and must often be replaced at frequent intervals to maintain equipment in operation.

Thus, as one example, flashing lights are now commonly used along highways and other locations to warn of dangerous conditions. These flashing lights in remote locations are typically incandescent or gas discharge lamps connected to some style of relaxation oscillator powered by a battery. The batteries involved in such blinking lights have a limited lifetime and must be periodically replaced, typically each 250–300 hours of operation. This involves a rather large labor cost in replacing the expended batteries with fresh ones and additional cost for primary cells or for recharging secondary cells. It is desirable to provide an electric power pack capable of providing a sufficient quantity of electrical energy over a prolonged period of time so that the requirement for periodic replacement of the electrolytic cells can be avoided. Such a power pack is valuable even if appreciably more expensive than batteries beacuse of the greatly reduced labor for periodic replacement.

BRIEF SUMMARY OF THE INVENTION

There is provided in practice of this invention according to a presently preferred embodiment semiconductive compositions selected from the group consisting of selenium with from 4.85 to 5.5% tellurium, from 3.95 to 4.2% germanium, from 2.85 to 3.2% neodymium, and from 2.0 to 2.5% gallium; selenium with from 4.8 to 5.5% tellurium, from 3.9 to 4.5% germanium, from 2.9 to 3.5% neodymium, and from 4.5 to 5.0% rubidium; and germanium with from 4.75 to 5.5% tellurium, from 4.0 to 4.5% neodymium and from 5.5 to 7.0% rubidium.

DRAWINGS

These and other features and advantages of the invention will be appreciated as the same becomes better understood by reference to the following detailed description of a presently preferred embodiment when considered in connection with the accompanying drawings wherein:

FIG. 3 is an electric circuit schematic of the system.

DESCRIPTION

Figure 1:
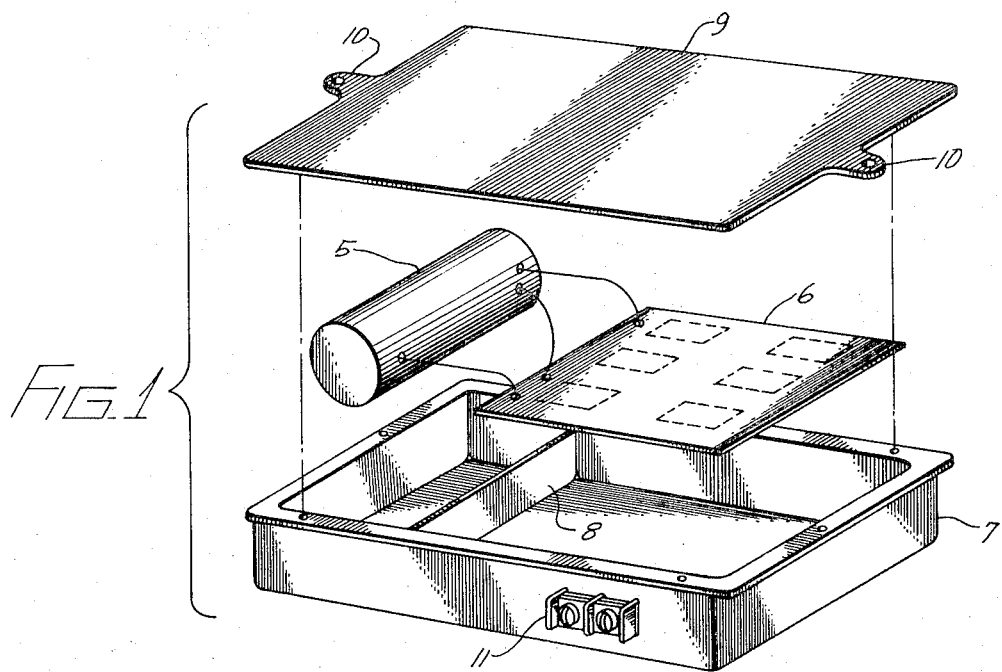
FIG. 1 illustrates in exploded schematic a flashing lamp connected to an electric power supply constructed according to principles of this invention.

FIG. 1 illustrates schematically a typical flashing lamp having a power supply constructed according to principles of this invention. As illustrated in this presently preferred embodiment an electric power pack 5 is electrically connected to a relaxation oscillator circuit (shown only schematically) on a conventional printed circuit board 6. The power pack 5 and printed circuit board are mounted in a metal box 7 having a transverse partial partition 8 defining a space for the power pack and another space for the printed circuit board which is supported away from contact with the box by any convenient insulator. Preferably these elements are potted in place in a conventional manner. A cover 9 having mounting ears 10 is riveted on the box after assembly. A small terminal strip 11 on one side of the box 7 provides electrical contacts for connection to a load such as an incandescent lamp (not shown in FIG. 1). The lamp provides a flash of light when the relaxation oscillator switches. Although the described system is employed for a flashing lamp, it will be apparent to one skilled in the art that this is only exemplary and other applications can be made.

Figure 2:
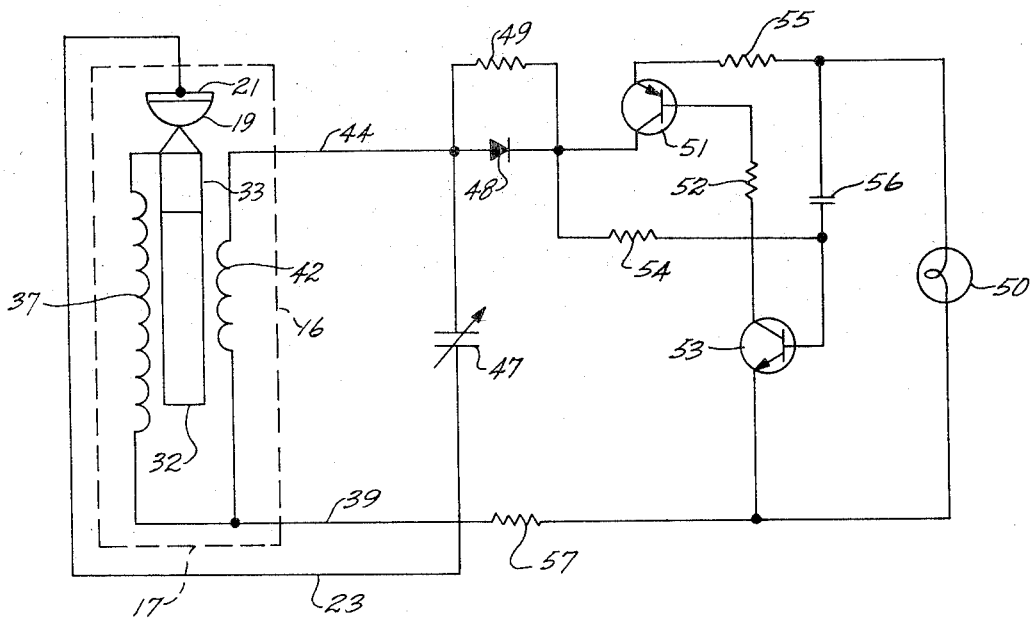
FIG. 2 illustrates in longitudinal cross section the power pack of FIG. 1.

The electric power pack 10 is illustrated in longitudinal cross section in FIG. 2 and has dimensions as set out here after. These dimensions are exemplary of the illustrt aed embodiment for operating a conventional flasher lamp, and it will be apparent that other dimensions may be employed for other applications. In particular, the dimensions may be enlarged in many circumstances in order to obtain somewhat higher power levels and different voltage or current levels. The power pack comprises a cylindrical metal tube 16 having closely fitting metal caps 17 at each end, which are preferably sealed to the tube after the internal elements are inserted in place. The metal tube 16 and caps 17, which are preferably of aluminum, thus form a closed conductive envelope which in a typical embodiment has an inside diameter of about 0.8 inch and a length of about 2¼ inch.

Mounted within one end of the envelope is a plastic cup 18, the dimensions of which are not extremely critical; however, a wall thickness of at least ⅟₁₆ inch is preferred. Mounted within the plastic cup 18 is a semiconductor tablet 19 having a flat base and somewhat domed opposite side. The composition of the semiconductor tablet 19 is set out in greater detail hereinafter. Typically, the semiconductor tablet has a mass of about 3.8 grams. A metal disk 21 is positioned beneath the base of the tablet 19 in the cup 18, and is preferably adhesively bonded into the cup. The metal disk is tightly fitted to the base of the tablet so that good electrical contact is obtained over a substantial area of the semiconductor. An ear 22 on one edge of the disk is soldered to a lead wire 23 which extends through a short insulating sleeve 24 in a hole in the side of the metal envelope. The insulating sleeve 24 assures spacing of the lead wire 23 from the tube 16 and prevents accidental damage to the insulation on the lead wire which could lead to shorting to the metal case. Preferably, the insulating sleeve 24 is sealed with a small amount of plastic cement or the like in order to maintain clean air within the cylindrical envelope. Two other openings for leads through the tube 16, as hereinafter set forth, are also preferably sealed for maintaining cleanliness within the envelope.

A pair of circular metal disks 26 are fitted within the tube 16 and preferably cemented in place to prevent shifting. The two disks 26 are equally spaced from the opposite ends of the envelope and are spaced apart a little over 1.15 inch. Each of the disks 26 includes a central aperture 27, and there are a plurality of holes 28 extending through the disk in a circular array midway between the center of the disk and its periphery. The holes 28 are preferably in the size range of about 0.010 to 0.060 inch, and there are 12 on each disk on 30° centers around the circle. The two disks 26 thus divide the interior of the cylindrical envelope into three chambers, and the pattern of holes 28 provides communication between the chambers and affects the electrical properties of the cavity. It is believed that the pattern of holes affects the inductive coupling between the several cavities within the envelope for influencing oscillations therein. Although an arrangement of 12 holes on 30° centers has been found particularly advantageous in the illustrated embodiment, it is found in other arrangements that a pattern of 20 holes on 18° centers or a pattern of 8 holes on 45° centers, provides optimum operation. In either case, the circle of holes 28 is midway between the center and the periphery of the disk.

Mounted between the disk 26 is a plastic spool 29 having an inside distance of 1.1 inch between the ends. The plastic spool 29 is preferably relatively thin walled and has an internal bore diameter of ⅛ inch. A plastic mounting plug 31 is inserted through the central aperture 27 of one of the disks 26 remote from the semiconductor table 19, and into the bore of the spool 29. The plastic plug 31 is preferably cemented in place to the disk 26 for holding the assembly together.

Also mounted within the bore of the spool 29 is a cylindrical ferrite core 32 about ⅛ inch diameter and ¾ inch long. Although a core of any magnetic ferrite is preferred, other ferromagnetic materials having similar properties can be employed if desired. The core 32 is in electrical contact with a metal probe 33 about ¼ inch long. Half of the length of the probe 33 is in the form of a cylinder positioned within the spool 29, and the other half is in the form of a cone ending in a point 34 in contact with the domed surface of the semiconductor tablet 19, thereby making electrical contact with the semiconductor in a relatively small point.

Electrical contact is also made with the probe 33 by a lead 36 that passes through one of the holes 28 in the disk 26 nearer the semiconductor tablet and thence to a primary coil 37 wound on the plastic spool 29. The primary coil 37 is in the form of 800 to 1,000 turns wound along the length of the spool, and the lead 28 at the opposite end of the coil 37 is soldered to one of the external leads 39 of the power pack. This lead 39 proceeds through one of the holes 28 in the disk remote from the semiconductor tablet 19 and through an insulated sleeve 41 in the metal tube 16. The lead 39 is also connected to one end of a secondary coil 42 which is in the form of eight to ten turns around the center portion of the primary coil 37. A thin insulating sheet 43 is preferably provided between the primary and secondary coils. The other lead 44 from the secondary coil passes through one of the holes 28 in the disk nearer the semiconductor tablet and thence through an insulating sleeve 46 through the wall of the tube 16.

FIG. 3 illustrates schematically the electrical circuit employing an electric power pack constructed according to the principles of this invention. At the left-hand side of FIG. 3 the arrangement of elements is illustrated in a combination of electrical schematic and mechanical position within the tube 16 for ready correlation with the embodiment illustrated in FIG. 2. Thus, the semiconductor tablet 19, probe 33, and ferrite core 32 are shown in both their mechanical and electrical arrangement, the core being inductively coupled to the coils 37 and 42. The lead 23 from the metal base of the semiconductor tablet 19 is connected to a variable capacitor 47, the other side of which is connected to the lead 44 from the secondary coil 42. The lead 44 is also connected to a rectifying diode 48 shunted by a high resistance resistor 49.

It will be seen that the variable capacitor 47 is in a tank circuit with the inductive coils 37 and 42 which are coupled by the ferrite core 32, and this circuit also includes the semiconductor tablet 19 to which point contact is made by the probe 33. The mechanical and electrical arrangement of these elements provides a resonant cavity in which resonance occurs when the capacitor 47 is properly trimmed. The diode 48 rectifies the oscillations in this circuit to provide a suitable DC for operating an incandescent lamp 50 or similar load.

The rectifying diode 48 is connected to a complementary symmetry relaxation cricuit for switching power to the load 50. The diode is connected directly to the collector of a PNP transistor 51 which is in an inverted connection. The emitter of the PNP transistor is connected to one side of the load 50 by way of a timing resistor 55. The base of the transistor 51 is connected by way of a resistor 52 and a capacitor 56 to the collector of an NPN transistor 53, the emitter of which is connected to the other side of the load 50. The base of the NPN transistor 53 is coupled to the diode by a resistor 54. The emitter of the PNP transistor 51 is fed back to the base of the NPN transistor 53 by the resistor 55. Current flow through the lamp 50 is also limited by a resistor 57 which couples one side thereof and the emitter of the NPN transistor 53 to the two coils 37 and 42 by way of the common lead 39.

The electrical power pack is believed to operate due to a resonance amplification once an oscillation has been initiated in the cavity, particularly the central cavity between the disks 26. This oscillation, which apparently rapidly reaches amplitudes sufficient for useful power, is then half wave rectified by the diode 48 for use. With such an arrangement, a voltage level of several volts has been obtained, and power sufficient for intermittent operation of a lamp requiring about 170–250 milliwatt has been demonstrated. The resonant amplification is apparently due to the geometrical and electrical combination of the elements, which provide inductive coupling of components in a suitable resonant circuit. This amplification is also, at least in part, due to unique semiconductor properties in the tablet 19, which has electronic properties due to a composition giving a unique atomic arrangement, the exact nature of which has not been measured.

The semiconductor tablet has electronic properties which are determined by the composition and three such semiconductors satisfactory for use in the combination have been identified. In two of these, the base semiconductor material is selenium provided with suitable dopant elements, and in the third, the base element is germanium, also suitably doped. The semiconductor tablets are made by melting and casting in an arrangement that gives a large crystal structure. It has not been found necessary to provide a selected crystal orientation in order to obtain the desired effects.

A preferred composition of the semiconductor includes about 5% by weight of tellurium, about 4% by weight of germanium, about 3% by weight of neodymium, and about 4.7% by weight of rubidium, with the balance of the composition being selenium. Such a composition can be made by melting these materials together or dissolving the materials in molten selenium.

Another highly advantageous composition has about 5% by weight of tellurium, about 4% by weight of germanium, about 3% by weight of neodymium, and about 2.24% by weight of gallium, with the balance being selenium. In order to make this composition, it is found desirable to add the very low melting gallium in the form of gallium selenide rather than an elemental gallium.

A third suitable composition has about 5% by weight of tellurium, about 4% by weight of neodymium, about 6% by weight of rubidium, with the balance being germanium. The preferred compositions set forth hereinabove are not absolute and it has been found that the level of dopant in the compositions can be varied within limits without significant loss of performance. Thus, it is found that the proportion of tellurium in the preferred composition can range from about 4.8 to about 5.5% by weight; the germanium can range from about 3.9% to 4.5%; neodymium can range from about 2.9 to 3.5% by weight; and rubidium can vary from about 4.5 to 5.0% by weight. The balance of the preferred composition is selenium, although it has also been found that nominal impurity levels can be tolerated and no great care is required in preventing minor contamination.

The other selenium base composition useful in practice of this invention can have a tellurium concentration in the range of from about 4.85 to 5.5% by weight; germanium in the range of from about 3.95 to 4.2% by weight; neodymium in the range of from about 2.85 to 3.2% by weight; and gallium in the range of from about 2.0 to 2.5% by weight. As in the preferred composition, the balance is selenium and nominal impurity levels can be tolerated. It is preferred to add the gallium in the form of gallium selenide rather than as elemental gallium with a corresponding decrease in the selenium used to make up the composition.

The above selenium base compositions are easier to make and less expensive than the germanium base composition and are therefore preferable for most applications. It is found that these are particularly suited for relatively small semiconductor tablets up to about 1 inch or a little less. For relatively large tablets, it is preferred to use the germanium base composition.

The germanium base composition has a tellurium level in the range of from about 4.75 to 5.5% by weight; neodymium in the range of from about 4.0 to 4.5% by weight; and rubidium in the range of from about 5.5 to 7.4% by weight. It is also found that it is of greater importance to maintain purity of the germanium base compositions than the selenium base compositions. Although the exact purity levels have not been ascertained, it is in excess of 99%.

It has been found that it is not necessary to have single crystals in the semiconductor tablets and any convenient grain size in excess of about 1 millimeter appears satisfactory. In the above compositions, when the recited ranges are exceeded, oscillation in the power pack drops off rapidly and may cease altogether.

The reasons that these compositions are satisfactory in the arrangement providing resonance amplification has not been determined with certainty. It is possible that the semiconductor serves as a source of electrons for providing an oscillating current in the circuit. This is, of course, combined with a relatively large area contact to one side of the semiconductor tablet, and a point contact on another area. Any resonant current in the coils wound on ferrite rod induces a varying magnetic field in the resonant cavity, and the electrical connection between the ferrite rod and the metal probe provides a feedback of this oscillation to the semiconductor tablet.

It should particularly be noted that the oscillation in the circuit does not commence until it is initiated by an oscillating signal. In order to accomplish this, it is only necessary to apply a few millivolts AC for a few seconds to the semiconductor tablet and the associated coils coupled thereto. The initial signal applied to the base of the semiconductor tablet and the lead 39 is preferably in the frequency range of 5.8 to 18 mHz. and can be as high as 150 mHz. Such a signal can be applied from any conventional source and no great care appears necessary to provide a single frequency signal or eliminate noise. Once such energization has been given the circuit, and oscillations initiated, it does not appear to again be necessary to apply such a signal. This is apparently due to the feedback provided by the ferrite rod to the probe making point contact with the semiconductor.

Energy is, of course, dissipated in the lamp, or other utilization device, as the combination operates. Such energy may come from deterioration of the semiconductor tablet as oscillations continue; however, if there is such deterioration it is sufficiently slow that a power source may be operated for many months without attendance. Such a source of energy may be augmented by ambient RF radiation coupled into the resonant cavity by the external leads. This is a surprising phenomenon because the leads are small as compared to what would normally be considered an adequate antenna, and it is therefore postulated that stimulated amplification may also be a consequence of the unique electronic configuration of the semiconductors having the above-identified compositions.

Although only one embodiment of electric power pack constructed according to principles of this invention has been described and illustrated herein, many modifications and variations will be apparent to one skilled in the art. Thus, for example, a larger power pack may be axially arranged in a cylindrical container with various electronic elements arranged in the annular space therebetween. It is, therefore, to be understood that within the scope of the appended claims the invention may be practiced otherwise than as specifically described.

I claim:

1. A semiconductive composition selected from the group consisting of selenium including dopants consisting of tellurium in the range of from 4.8 to 5.5% by weight, germanium in the range of from about 3.9 to 4.5% by weight, neodymium in the range of from about 2.85 to 3.5% by weight, and either gallium in the range of from about 2.0 to 2.5% by weight or rubidium in the range of from about 4.5 to 5.0% by weight; and germanium including dopants consisting of tellurium in the range of from 4.75 to 5.5% by weight, neodymium in the range of from 4.0 to 4.5% by weight, and rubidium in the range of from about 5.5 to 7.0% by weight.

2. A semiconductive composition as defined in claim 1 comprising tellurium in the range of from 4.8 to 5.5% by weight, germanium in the range of from about 3.9 to 4.5% by weight, neodymium in the range of from about 2.9 to 3.5% by weight, rubidium in the range of from about 4.5 to 5.0% by weight with a balance of selenium.

3. A semiconductive composition as set forth in claim 2 having a composition of about 5% by weight of tellurium, about 4% by weight of germanium, about 3% by weight of neodymium, about 4.7% by weight of rubidium, and a balance of selenium.

4. A semiconductive composition as defined in claim 1 comprising tellurium in the range of from about 4.85 to 5.5% by weight, germanium in the range of from about 3.95 to 4.2% by weight, neodymium in the range of from about 2.85 to 3.2% by weight, gallium in the range of from about 2.0 to 2.5% by weight, and a balance of selenium.

5. A semiconductive composition as defined in claim 4 comprising about 5% by weight of tellurium, about 4% by weight of germanium, about 3% by weight of neodymium, about 2.24% by weight of gallium and a balance of selenium.

6. A semiconductive composition as set forth in claim 1 comprising tellurium in the range of from about 4.75 to 5.5% by weight, neodymium in the range of from about 4.0 to 4.5% by weight, rubidium in the range of from about 5.5 to 7.0% by weight, and a balance of germanium.

7. A semiconductive composition as defined in claim 6 comprising about 5% by weight of tellurium, about 4% by weight of neodymium, about 6% by weight of rubidium, and a balance of germanium.

References Cited

UNITED STATES PATENTS

| | | | |
|---|---|---|---|
| 3,327,137 | 6/1967 | Oushinsky | 317—234 V |
| 3,348,045 | 10/1967 | Brau et al. | 106—47 R |
| 3,440,068 | 4/1969 | Patterson et al. | 317—234 F |
| 3,511,992 | 5/1970 | Patterson | 106—47 R |

OTHER REFERENCES

A. R. Hilton et al., "Non-Oxide IVA–VA–VIA Chalcogenide Glasses," Physics and Chemistry of Glasses, vol. 7, No. 4 (August 1966), pp. 105–126.

CHARLES E. VAN HORN, Primary Examiner

U.S. Cl. X.R.

317—239, 241; 315—241